United States Patent
Nazri

(10) Patent No.: US 7,640,896 B2
(45) Date of Patent: Jan. 5, 2010

(54) AMMONIA STORAGE FOR ON-VEHICLE ENGINE

(75) Inventor: Gholam-Abbas Nazri, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 299 days.

(21) Appl. No.: 11/692,373

(22) Filed: Mar. 28, 2007

(65) Prior Publication Data

US 2008/0241033 A1    Oct. 2, 2008

(51) Int. Cl.
F02B 43/08    (2006.01)

(52) U.S. Cl. .................. 123/3; 123/527; 123/198 A; 123/DIG. 12; 123/557

(58) Field of Classification Search ............ 123/1 A, 123/3, 543, 546, 557, DIG. 12, 198 A
See application file for complete search history.

(56) References Cited

U.S. PATENT DOCUMENTS

| | | | | |
|---|---|---|---|---|
| 4,480,595 A * | 11/1984 | Hobby et al. | ............ | 123/1 A |
| 6,266,955 B1 * | 7/2001 | Liang et al. | ............ | 60/274 |
| 6,826,906 B2 * | 12/2004 | Kakwani et al. | ............ | 60/303 |
| 7,143,578 B2 * | 12/2006 | Kakwani et al. | ............ | 60/286 |
| 7,485,211 B2 * | 2/2009 | Botte et al. | ............ | 204/293 |
| 2007/0207351 A1 * | 9/2007 | Christensen et al. | ........ | 429/17 |
| 2008/0248353 A1 * | 10/2008 | Grieve et al. | ............ | 429/26 |

OTHER PUBLICATIONS

Tue Johannessen and Rasmus Zink Sorensen, "Handheld Hydrogen-a new concept for hydrogen storage", tce (the chemical engineer), Nov. 2005, www.tcetoday.com, pp. 30-32.

* cited by examiner

*Primary Examiner*—Hai H Huynh

(57) ABSTRACT

Ammonia is used as precursor source of hydrogen fuel in an on-vehicle internal combustion engine. Ammonia is stored as, for example, a ligand in an on-vehicle transition metal composition. Upon demand for hydrogen by the vehicle's engine control system, ammonia is expelled as a gas from some of the composition and the ammonia gas is dissociated into a mixture of hydrogen and nitrogen and delivered as a fuel-containing mixture to the engine. In a preferred embodiment, the hydrogen is used as a supplement to gasoline as a fuel for engine operation.

9 Claims, 1 Drawing Sheet

AMMONIA STORAGE FOR ON-VEHICLE ENGINE

TECHNICAL FIELD

This disclosure pertains to the reversible storage of ammonia in a solid compound as a hydrogen precursor fuel source for an on-vehicle internal combustion engine adapted to operate on hydrogen or, for example, a combination of hydrogen and gasoline as fuel. For example, ammonia is stored as a ligand in a transition metal coordination compound, and, when hydrogen is required, ammonia is released from the compound, dissociated into hydrogen and nitrogen, and the hydrogen-nitrogen mixture delivered to the engine for combustion of its hydrogen content. Alternatively, a separation of the hydrogen and nitrogen may be performed and hydrogen delivered as a hydrogen-rich stream for combustion.

BACKGROUND OF THE INVENTION

There is interest in reducing consumption of gasoline in vehicles powered by internal combustion engines. To achieve this goal, some vehicle engine systems are adapted to recognize and distinguish between gasoline or a mixture of gasoline and ethanol being pumped from the vehicle fuel tank for injection into the cylinders of the engine. Air is also inducted into the cylinders and the fuel must be injected in an amount for combustion to power the engine and to achieve a suitable exhaust composition for treatment and discharge to the air.

There is also interest in supplementing gasoline with hydrogen but it is difficult to safely store hydrogen gas onboard a vehicle. There remains a need for identifying storable fuels or fuel precursors for conserving gasoline in current passenger and commercial vehicles or in other power plants utilizing hydrogen or a carbon-containing fuel.

SUMMARY OF THE INVENTION

Ammonia ($NH_3$) is stored in a solid composition as a hydrogen fuel precursor for a vehicle internal combustion engine that is operated to use hydrogen or a combination of hydrogen and gasoline as fuel. Ammonia is suitably stored as an ligand coordinated with a transition metal compound (or coordination complex) with each coordinated metal compound molecule containing one or more (often several) molecular ammonia ligands. Transition metal coordination compounds (suitably compounds of cobalt, iron, or nickel) are preferred because the temperatures and rates of ammonia release (and re-absorption) are particularly suitable for the on-vehicle storage and use of hydrogen precursor. Each ammonia molecule (the ligand or ligands) contributes electrons to a receptive transition metal ion in a coordination compound molecule (e.g., salt molecule) to form a coordinated complex that includes releasable ammonia molecules. Such ammonia-holding materials may be prepared as a powder for onboard vehicle storage. An ammonia-containing composition is selected for its ammonia content and its suitability for storage at ambient conditions on the vehicle at substantially atmospheric pressure.

Upon demand for hydrogen fuel, a measured portion of the on-vehicle stored material is activated, usually heated, to progressively expel gaseous ammonia from the ammonia-containing composition. Vehicle engine heat and/or exhaust gas heat may be used for this purpose. A stream of the expelled ammonia is further heated as necessary and subjected to known ammonia dissociation conditions to decompose the ammonia into hydrogen and nitrogen. Suitable catalysts are known for this ammonia dissociation reaction. The stream of hydrogen and nitrogen is delivered to the engine for combustion of its hydrogen content with oxygen from air inducted into the engine.

Alternatively, the hydrogen may be separated from the nitrogen and a hydrogen enriched stream delivered to the engine. For example, the larger nitrogen molecules may be selectively absorbed or trapped, for example, in a column of molecular sieves and removed from the $H_2$ and $N_2$ mixture to leave a gas stream that is substantially enriched in its hydrogen content.

After the ammonia-containing transition metal compound powder (or liquid) is depleted of its ammonia content, it may be removed from on-vehicle storage and replaced with restored ammonia-containing material. The ammonia depleted composition is reacted with ammonia at a suitable reactor area. In most instances, the storage and release of ammonia from transition metal (e.g., cobalt, iron, nickel) salts is a particularly efficient and reversible process.

This practice of storing ammonia on-vehicle in a suitable transition metal composition as a hydrogen precursor may be used in a hydrogen-fueled engine. However, in general, it is preferred to use the ammonia as a fuel precursor in an engine adapted to run on both gasoline and hydrogen. The hydrogen is generated and employed to reduce the consumption of gasoline. Such hydrogen generation and usage may best be undertaken when the vehicle is operating under more or less steady state conditions such as idle operation or highway operation. However, in accordance with known technology, suitably programmed fuel composition recognition and delivery control instruments can be adapted to accommodate the use of ammonia as a source of hydrogen in all driving conditions.

Other objects and advantages of the invention will be apparent from a description of preferred embodiments of the invention, which follows.

DESCRIPTION OF PREFERRED EMBODIMENTS

Figure 1:
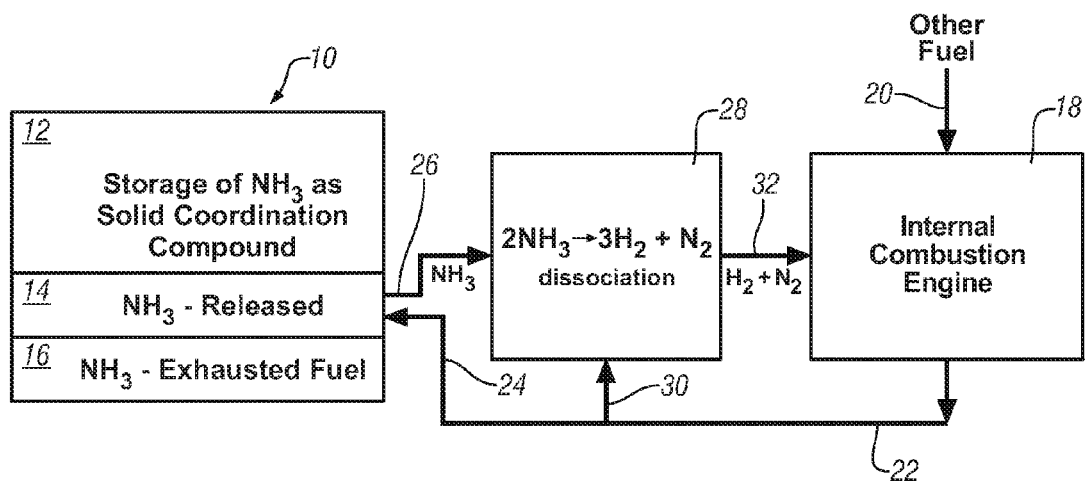
FIG. 1 is a schematic flow diagram illustrating on-vehicle storage of powder of an ammonia-containing transition metal coordination compound in a three-compartment vessel, delivery of ammonia from the storage vessel to a reactor in which ammonia gas is dissociated into hydrogen and nitrogen, and delivery of a gas mixture of hydrogen and nitrogen to an internal combustion engine.

A method of operating a two-fuel engine (or hybrid fueled engine) is provided. Hydrogen fuel delivery is managed to supplement gasoline usage with the availability of hydrogen produced from liquid or solid-state ammonia storage. Hydrogen may be used in an otherwise conventional gasoline fueled internal combustion engine. Due to the thermal requirements of this process it may be preferred to use the hydrogen during periods of more or less steady state engine operation.

One of the requirements of using hydrogen as a fuel is to develop a dense and safe hydrogen storage system. Among various chemical compounds, ammonia with 17.6 wt % hydrogen is a promising candidate as hydrogen carrier. This invention provides a method for using ammonia in a condensed and solid-state form as a hydrogen source with little likelihood of a release of ammonia gas in the event of a rupture of storage system. In addition, the storage of ammonia as a hydrogen precursor doesn't require a high-pressure tank. A low cost plastic or composite tank can be used to contain the proposed solid-state ammonia storage materials.

The drawing figures provide a basis for a summary description of embodiments for using an ammonia-containing transition metal coordination compound in powder form for on-vehicle stage and usage in providing hydrogen to a hydrogen-consuming vehicle power generating device. Further details concerning the preparation and use of ammonia-containing materials are provided following the descriptions of the schematic flow diagrams of FIGS. 1-3.

FIG. 1 provides a basis for a summary view of a preferred embodiment. A three-compartment storage vessel 10 is located on an automotive vehicle for containing an ammonia-containing coordination compound (e.g., $FeCl_2(NH_3)_6$) in the form of a suitable volume of milled powder. Storage vessel 10 is preferably located so that it is exposed to normal ambient conditions that the vehicle experiences but not to full engine or engine exhaust heat. However, as is described below, a portion of the contents of storage vessel 10 are heated to expel ammonia gas.

Ammonia-containing powder is contained within the upper compartment 12 of storage vessel 10. The vehicle is powered by a hydrogen-using internal combustion engine indicated at 18. The engine may be, for example, a gasoline and hydrogen consuming internal combustion engine. Thus, the engine may utilize a second or alternative hydrocarbon-containing stream 20 in addition to a hydrogen stream provided in accordance with this invention. Heat is normally generated in the operation of engine 18 and it will be used as described in the following text.

Continually or periodically during engine operation its computer-managed electronic fuel supply control system (not illustrated) will signal for hydrogen-containing fuel. A portion of ammonia-containing powder is moved from upper compartment 12 to the next lower compartment 14, suitably by auger feed or by gravity flow through a port (not illustrated) in a suitable partition between the compartments 12, 14. Heat from engine 18, such as engine heat contained in circulating coolant flow, or engine exhaust heat, is used in dissociating ammonia gas from the portion of coordination compound powder now contained in compartment 14. Heat flow from the engine 18 is indicated by engine coolant flow stream 22 leaving engine 18 and the portion 24 of stream 22 being supplied to compartment 14 of storage vessel 10. The ammonia-containing powder in compartment 14 (but not that in compartment 12) is heated by stream 24 to release (dissociate) ammonia gas from the coordination powder. A stream of engine coolant flow returning to the power plant is not illustrated in FIG. 1 to simplify the illustration.

Ammonia gas flows from compartment 14 in gas stream 26 to an on-vehicle catalytic ammonia dissociation reactor 28. Dissociation reactor 28 requires heat which may be provided, at least in part by heat stream 30 which is a branch of heat stream 22 from engine 18. In dissociation reactor 28, ammonia is dissociated substantially completely in accordance with the reaction: $2NH_3 \rightarrow 3H_2+N_2$. A gas mixture of hydrogen and nitrogen (3 molecules of hydrogen per molecule of nitrogen) flows as stream 32 to engine 18 in which the hydrogen is used as at least a portion of the fuel requirements of the device.

Figure 2:
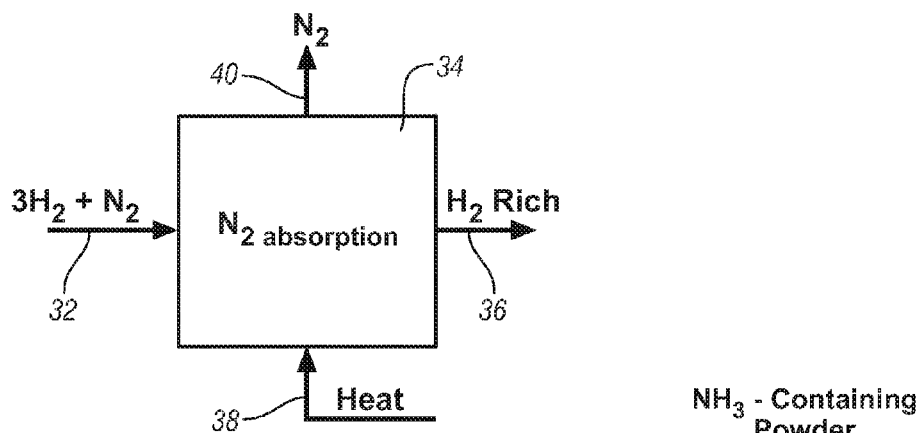
FIG. 2 is a schematic representation of an absorption vessel for receiving a mixture of hydrogen and nitrogen, temporarily absorbing, or separating, nitrogen into a suitable absorbent bed or column, and delivering a hydrogen-enriched gas to the on-vehicle engine.

In some embodiments of the invention it may be desired to supply engine 18 with a stream of hydrogen containing less nitrogen than is obtained from dissociation of ammonia. FIG. 2 illustrates the use of a nitrogen absorption or separating system 34. A dissociated ammonia stream 32 ($3H_2+N_2$) is passed through a bed or column of nitrogen absorbing material in absorption system 34. Nitrogen is selectively retained in absorption system 34 and a hydrogen rich stream 36 is delivered to engine 18. During periods in which the engine 18 is not calling for hydrogen and absorption system 34 is inactive, a heat stream 38 (for example, a branch of heat stream 22 form power system 18) is used to temporarily heat absorption material in absorption system 34 to expel nitrogen to the atmosphere as exhaust stream 40. Upon cooling, the nitrogen absorbing capacity of absorption system 34 is thus regenerated and available for continued use.

Figure 3:
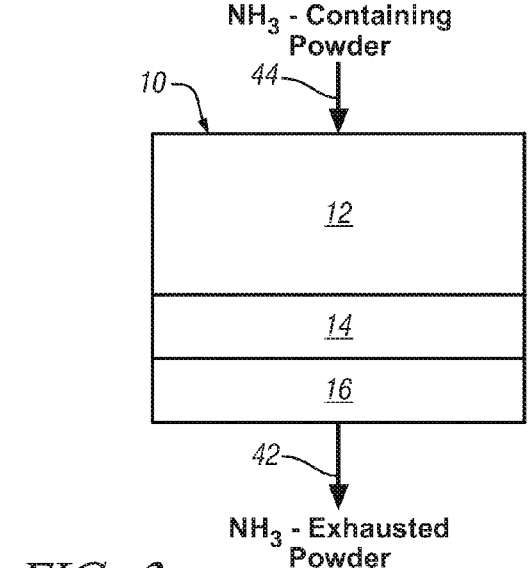
FIG. 3 is a schematic representation of the removal of ammonia-depleted or ammonia-exhausted transition metal powder from the storage vessel and replacement of the depleted powder with ammonia-containing powder.

FIG. 3 illustrates the use of ammonia storage vessel 10. Ammonia-exhausted powder is moved form ammonia-generation compartment 14 into compartment 16. In order to replace the supply of ammonia-containing coordination compound powder, the spent powder is removed form compartment 16 (indicated by directional arrow 42) for ammonia replenishment, and ammonia-containing powder is added to compartment 12 as indicated by arrow 44.

In accordance with above described embodiments of the invention, ammonia is stored in a liquid or solid-state transition metal coordination compound form that prevents odor and simplifies handling of ammonia as a hydrogen carrier fuel. When engine operation can best utilize hydrogen fuel in addition to, or in place of gasoline, ammonia is removed from its storage material, decomposed into hydrogen and nitrogen and the hydrogen-nitrogen mixture delivered to and consumed in the otherwise gasoline-fueled internal combustion engine. Engine waste heat may be used to produce hydrogen fuel from solid-state ammonia storage. Thus, in a preferred embodiment, this invention uses a conventional internal combustion engine with a "hydrogen" storage system (but with ammonia as the hydrogen source) without the need of normal hydrogen infrastructure. In other words, in accordance with this invention, hydrogen is generated "on-demand" from ammonia, as a hydrogen-precursor, and the hydrogen is immediately consumed in the on-vehicle engine with no need for hydrogen storage.

The on-board ammonia storage suitably comprises materials that contain ammonia ligands attached to transition metal ions or transition metal ions bonded to anions with various degrees of bonding strengths. Gaseous ammonia can be expelled from the transition metal compositions at moderate above-ambient temperatures by heat treatment of the solid or liquid ammonia storage material using engine heat or exhaust. The ammonia may then be cracked (dissociated) to hydrogen and nitrogen also using engine waste heat. With appropriate ammonia storage compositions, the ammonia extraction from the usually solid-state ammonia storage materials and ammonia replenishment into the storage materials may be a substantially fully reversible process.

In a preferred embodiment, this invention uses ammonia in the form of ligands or like chemical group attachments in solid chemicals such as A $(NH_3)_x$. Here A is a transition metal atom or transition metal element-containing ion which may be part of a salt or other chemical compound, coordination complex, or other solid structure capable of containing (absorbing and/or adsorbing) ammonia, and x is the number of ammonia molecules attached and stored in each molecular unit of the system. In a ligand structure ammonia moieties donate or share electrons with a metal ion to form a coordination compound in which the ammonia moieties are bound in a solid state.

The ammonia can be released from such a storage material at moderate temperatures depending on the chemical nature and structure of the specific composition. A representative empirical equation for the release of ammonia upon suitable heating is as follows:

$$A(NH_3)_x \rightarrow A + xNH_3$$

The temperature range for release of the ammonia can be tuned to a desired temperature by modification of A, or anions connected to the A ion.

Examples of solid-state ammonia hydrogen carriers are salts with large number of ammonia ligands, such as transition metal salts containing 1, 2, 4, 6, 8, 12, 18 ammonia moieties in the ligand structure. Ammonia molecules are released as a gas by raising the temperature of the complex compounds, and the ammonia molecules detach from the salt in one or multiple steps. Several examples of this type of solid-state ammonia storage are heat-treated and their ammonia storage capacities have been demonstrated.

The ammonia also can be released in a single step or in multi-steps as illustrated in the following equations.

$$Ni^{II}(NH_3)_6 \rightarrow Ni^{II}(NH_3)_2 + 4NH_3 \rightarrow Ni^{II} + 2NH_3$$

$$FeCl_2(NH_3)_6 \rightarrow FeCl_2 + 6NH_3$$

Transition metal salts such as sulfates, nitrates, chlorides, and suitable complex polyanions of cobalt, iron, or nickel (each usually in a +2 oxidation state) store significant amounts of ammonia (20-50 wt %) in liquid or solid-state forms that can be reversibly cycled.

EXPERIMENTAL EXAMPLES

The following examples illustrate the absorption of ammonia as a ligand into various metal compounds and the subsequent release of ammonia from the respective compounds.

Example 1

5 grams of ferrous ($F^{+2}$) sulfate was ground to fine powder of close to one micron particle size and placed in a glass tube flow-through reactor. The powder was exposed to flow of ammonia gas (600 ml/min) for one hour. The weight of the powder increased during the exposure to ammonia and the sample was determined as having absorbed close to six ammonia molecules per formula unit (e.g., $Fe^{II}(NH_3)_{about\ 6}SO_4$). The sample was saturated with ammonia in less than 30 minutes. One hundred milligrams of the sample was placed in a thermogravimetric analyzer and heated at 5 degrees per minutes under flow of argon gas. The sample weight was reduced in two steps and at 250° C. the ferrous sulfate sample released close to 5.5 mole ammonia per formula unit.

Four grams of the sample saturated with ammonia in this example, was placed in a flow-through glass tube reactor and heat treated at 250° C. under flow of argon. The sample was weighed after 30 minutes heat treatment. The sample weight was reduced and the weight loss was close to the six mole of ammonia per unit formula.

The repeatable reversible ammonia insertion—extraction with respect to ferrous sulfate was examined by again exposing a ferrous sulfate sample to the same flow of ammonia gas (600 ml/min) for 1 hour. The flow of ammonia gas was stopped and sample was weighed. The sample was heat treated at 250° C. for 1 hour under flow of argon gas. The sample was weighed again. This procedure was repeated four times, and a reversible weight gain for ammonia insertion under flow of ammonia gas and weight loss during extraction of ammonia by heat under argon gas was confirmed.

Example 2

Five grams of hydrated ferrous sulfate was placed in a glass tube reactor. The sample was heat treated under argon gas to 250° C. for 30 minutes to remove the water of crystallization. The dehydrated sample was cooled to room temperature and exposed to flowing stream of ammonia for 30 minutes. The sample weight was measured. The sample absorbed close to six ammonia molecules per formula weight of ferrous sulfate. The absorbed ammonia was then released by switching the ammonia gas to argon gas and heat treating the sample to 250° C. and marinating the heat for 30 minutes. The ammonia absorption and removal processes were repeated four times. It is observed that dehydrated iron sulfate absorbs and releases ammonia gas at a faster rate than was obtained with the anhydrous ferrous sulfate sample. Also, the color change of the ferrous sulfate powder, from light blue to dark blue as ammonia was absorbed and from dark blue to light blue as ammonia is released, occurred much faster than like color changes observed in Example 1.

Example 3

Five grams of anhydrous ferrous sulfate was ball milled for 90 minutes using a Spex 500 tungsten carbide vessel to a particle size of about 0.2 micron size. The ground sample was placed in the glass tube reactor and exposed to flow of ammonia for 30 minutes. The sample weight was measured after exposure to ammonia for 10, 20 and 30 minutes. The ball-milled sample absorbed ammonia at much faster rate and was saturated to six ammonia molecules per formula in less than 20 minutes.

Example 4

Similar tests were performed for cobalt ($Co^{+2}$) sulfate and nickel $Ni^{+2}$) sulfate. The cobalt(ous) sulfate and nickel(ous) sulfate samples also repeatedly absorbed ammonia during exposure to ammonia gas at ambient temperature and released ammonia gas when heat-treated under argon up to 250° C.

Example 5

Similar tests to example 1 were performed for iron, cobalt and nickel nitrates with these transition metals in their plus two oxidation states. Reversible ammonia insertion and extraction were also observed for these nitrate salts.

Example 6

Tests similar to the Example 1 experiments were performed using iron (+2), cobalt (+2), and nickel (+2) fluorides and chlorides. Reversible ammonia absorption and extraction for these salts was also observed.

Example 7

Samples of iron (+2), cobalt (+2), and nickel (+2) sulfates and chlorides were each ball milled for 30 minutes, 60 minutes and 90 minutes, respectively. Ammonia absorption tests were performed under flow of ammonia gas (600 ml/min), and the respective samples were weighed every 10 minutes. The ammonia extraction tests were performed under flowing argon gas as the samples were heated to 250° C. and samples were weighed before and after the heat treatment. Sample weights were measured under flow of Argon gas. Faster ammonia absorption and releases were obtained as the particle sizes of the ball milled samples became progressively smaller.

Example 8

Five grams of nickel (+2) sulfate was placed in a glass tube reactor and exposed to a flow of ammonia gas (600 ml/min) for one hour. The sample was heat treated at 250° C. under argon gas. The ammonia gas released form sample was trapped in a glass bubbler tube filled with 1 molar hydrochloric acid. The glass bubbler was also equipped with a pH meter. The pH of the solution was measured during the heat treatment. The pH of the solution inside the glass bubbler was increased continuously during the first 25 minutes and reached to a constant level.

Example 9

Twenty milliliters of the HCl solution from example 8 was placed in glass dish, and placed in a chamber under flow of dry Argon. After 24 hours a white powder was collected from the bottom of the glass dish. The white powder was examined by IR spectroscopy in a matrix of KBr pellet. The IR spectra of the sample were compared with the IR spectra of ammonium chloride. A perfect match between the two IR spectra indicates formation of ammonia chloride due to release of ammonia during heat treatment of the sample saturated with ammonia in previous test.

Example 10

IR spectra of samples of iron (+2), cobalt (+2), and nickel (+2), sulfates, nitrates and chlorides exposed to ammonia gas for 1 hour were examined. Each of the ammonia-exposed samples displayed the vibrational IR signature of ammonia containing samples.

Example 11

The reversibility of the ammonia absorption and ammonia release from a transition metal salt was observed during the following tests. Two glass vessels were connected to each other through a ¼ inch glass tube. In one glass vessel, five grams of anhydrous nickel (+2) sulfate salt (colored blue) and in another glass vessel 5 grams of nickel (+2) sulfate saturated with ammonia (white) were placed. The glass vessels were wrapped with heating tape, but leaving a clear window for observation. The vessel with saturated ammonia sample was heat treated to 250° C., and the other vessel kept cool and initially under vacuum. The valve between the two vessels was opened during heat treatment. The heated sample turned blue after 1 hour as it yielded its ammonia content. The blue coloration of the sample without ammonia was observed to change to white as it absorbed ammonia through the glass tube from the heated vessel. The valve between the two samples was closed, and the blue sample was cooled down to room temperature. The white sample was heat-treated and the valve between the two samples was opened. The white ammonia-containing sample turned blue as it gave up ammonia and the blue sample became progressively whiter as it absorbed ammonia. Complete color change to blue of the heated sample and blue-color loss of the other sample (at ambient temperature) were achieved in about 30 minutes. These sample color change tests were repeated four times confirming reversibility of the ammonia exchange to and from nickel(ous) sulfate.

Example 12

Similar tests to example 11 were performed for cobalt (+2) sulfate. A complete reversibility of ammonia absorption and release was also confirmed.

Example 13

Twelve grams of ammonia saturated nickel (+2) sulfate was placed in a glass tube which was connected to an ammonia dissociation catalyst tube containing a catalyst bed and maintained at 750° C. The ammonia dissociation catalyst was a mixture of nanometer size particles of a Co—NiO—Cu—Zr catalyst deposited in high surface area $TiO_2$ (about 1100 $m^2/g$) and two weight percent platinum deposited on alumina particles. The outlet of the ammonia dissociation tube was connected to an upright tube containing sodium shavings. The sodium shavings were carried in glass wool and secured near the outlet of the upright tube. The ammonia saturated nickel sulfate tube was heated to 250° C. Ammonia gas was released from the nickel sulfate was carried in a stream of argon into the heated ammonia dissociation tube. The argon stream exiting the ammonia dissociation tube was then conducted through a cooling loop (kept at room temperature) and the cooled argon stream then flowed through the upright tube containing the metallic sodium shavings. As the argon carrier stream contacted the surfaces of the sodium shavings they lost their metallic luster and took on a whitish color. After complete discoloration of the ammonia saturated nickel sulfate, the tarnished sodium pieces were removed without exposure to air and placed inside of a dry box filled with ultra pure argon. The tarnished sodium pieces were examined by x-ray diffraction and formation of sodium hydride, NaH, was confirmed. Ammonia had been released from the nickel sulfate. It was carried by the argon stream through the catalyzed vessel in which the ammonia was dissociated into hydrogen and nitrogen and the hydrogen was absorbed by the metallic sodium.

Usage of Ammonia Released from on-Board Storage.

The released ammonia is decomposed to hydrogen and nitrogen ($2NH_3 \rightarrow N_2 + 3H_2$) in an ammonia dissociation reactor sized, shaped, and located for on-vehicle operation. This practice was illustrated in Example 13 as described in the above section. The released ammonia stream is conducted into the reactor to flow over, for example, a catalyst (transition metals and alloys dispersed over high surface area catalyst supports) in known ammonia dissociation practices with an efficiency (or yield) higher than 99.9%. This non-polluting process is a suitable hydrogen generation system for on-vehicle internal combustion engine applications.

As stated this ammonia storage system can be used to deliver hydrogen as a supplementary fuel to a conventional gasoline engine. Engine waste heat (or heat form another on-vehicle power generating device) is directed and used to release ammonia from its solid storage material and then to promote the decomposition of ammonia into a gas mixture of hydrogen and nitrogen. In one embodiment of the invention, this hydrogen/nitrogen stream is directed to an otherwise gasoline-fueled engine in which it is mixed with air and burned in the operation of the engine. The goal of this invention is to achieve lower consumption of gasoline (or gasoline containing ethanol), yield improved fuel economy, and to generate less $CO_2$ emission. This invention uses the conventional engine, and already available infrastructure for fueling current vehicles.

The hydrogen-enriched, or hydrogen and nitrogen mixture is directed to the intake manifold or combustion cylinders of the engine. The engine operating computer, having called for the hydrogen, detects the composition of the incoming stream and manages its flow rate, with concurrent air induction, to form a suitable combustion mixture in the cylinders of the engine. Depending on pre-programmed engine operation hydrogen or hydrogen/nitrogen may be used with gasoline during some stages of engine operation. In other stages of engine operation, hydrogen alone may be used as the fuel to achieve zero emission of carbon for inner-city driving.

Thus, a new method of multi-fuel or hybrid engine operation is proposed. A hydrogen precursor is employed in the form of ammonia temporarily stored in the form of a solid material. Upon engine operation management ammonia is extracted from a stable and safe on-vehicle storage medium, converted to hydrogen and used in engine operation.

Spent fuel storage material is removed from on-vehicle storage and taken to a suitable site for re-loading with ammonia.

The practice of the invention is describe with examples with are intended to be illustrative of the invention but not limiting of it.

The invention claimed is:

1. A method of operating an on-vehicle internal combustion engine using hydrogen as a fuel, the vehicle comprising an engine operating control system for selectively demanding delivery of hydrogen to the engine during a period of engine operation, the method comprising:
    storing a hydrogen precursor composition comprising an ammonia-containing transition metal coordination compound on the vehicle in an ammonia storage vessel; and upon demand for hydrogen for the engine,
    heating at least a portion of the hydrogen precursor composition to expel ammonia gas;
    dissociating the ammonia gas into a gaseous mixture of hydrogen and nitrogen;
    absorbing at least a portion of the nitrogen from the gaseous mixture of hydrogen and nitrogen to form a hydrogen-enriched gas; and
    delivering the hydrogen-enriched gas to the engine.

2. A method of operating an on-vehicle engine as recited in claim 1 further comprising:
    storing on the vehicle a hydrogen precursor composition in the form of a volume of particles, the particles comprising an ammonia-containing transition metal coordination compound; and upon demand for hydrogen by the engine operating control system, and
    heating at least a portion of the particles to expel ammonia gas.

3. A method of operating an on-vehicle engine as recited in claim 2 and further comprising separating nitrogen from the gaseous mixture of hydrogen and nitrogen by passing the gaseous mixture through a bed of nitrogen absorbing material, delivering hydrogen-enriched gas to the engine, and, subsequently, heating the bed of nitrogen absorbing material to expel absorbed nitrogen.

4. A method of operating an on-vehicle internal combustion engine as recited in claim 1 in which engine heat or engine exhaust heat is used to heat the hydrogen precursor composition.

5. A method of operating an on-vehicle internal combustion engine as recited in claim 1 in which ammonia is stored in a solid composition comprising one or more salts selected from the group consisting of cobalt salts, iron salts, and nickel salts.

6. A method of providing hydrogen to a hydrogen-using internal combustion engine used to propel an automotive vehicle, the method comprising
    storing, in a first compartment of an on-vehicle ammonia storage vessel, an ammonia-containing transition metal material as a hydrogen precursor, the ammonia-containing material being solid or liquid in the on-vehicle first compartment; and, when the engine requires hydrogen;
    successively transferring portions of the ammonia-containing material from the first compartment to a second compartment of the ammonia storage vessel;
    successively heating portions of the ammonia-containing material in the second compartment to expel ammonia, as a hydrogen precursor, from the ammonia-containing material and from the on-vehicle second compartment, thereby forming an ammonia-depleted material;
    successively transferring ammonia-depleted material from the second compartment to a third compartment of the ammonia storage vessel; and periodically,
    replacing ammonia-depleted material in the on-vehicle ammonia storage vessel with ammonia-containing material.

7. A method of providing hydrogen to an engine as recited in claim 6 in which ammonia-depleted material is removed from the vehicle ammonia storage vessel and ammonia-containing material is added to the storage vessel.

8. A method of providing hydrogen to an engine as recited in claim 6 in which the ammonia-containing material is a composition that, when depleted of ammonia, can be restored to an ammonia-containing material by reaction with ammonia gas or vapor.

9. A method of providing hydrogen to a hydrogen-using power system as recited in claim 6 in which the ammonia-containing material comprises one or more salts selected from the group consisting of cobalt salts, iron salts, and nickel salts.

* * * * *